United States Patent [19]
Hatano et al.

[11] Patent Number: 5,390,876
[45] Date of Patent: Feb. 21, 1995

[54] HOLDER FOR FIXING WIRING HARNESS AND THE LIKE TO AUTOMOBILE BODY

[75] Inventors: Takanori Hatano, Okazaki; Takayoshi Ito, Yokkaichi; Noboru Miyazaki, Wako; Ryuji Umehara, Wako; Tomoharu Kamo, Wako, all of Japan

[73] Assignees: Sumitomo Denso Kabushiki Kaisha, Yokkaichi; Honda Giken Kogyo Kabushiki Kaisha, Tokyo, both of Japan

[21] Appl. No.: 154,517

[22] Filed: Nov. 19, 1993

[51] Int. Cl.⁶ ................................. F16L 3/00
[52] U.S. Cl. ...................... 248/73; 248/68.1; 248/74.1
[58] Field of Search ............... 248/73, 74.1, 74.2, 248/65, 67.7, 74.3, 68.1; 24/20 TT

[56] References Cited
U.S. PATENT DOCUMENTS 4,478,381 10/1984 Pittion et al. .................. 248/74.1 X
4,518,138 5/1985 Stutenkemper et al. ............. 248/73
4,669,688 6/1987 Itoh et al. ...................... 248/68.1 X

*Primary Examiner*—Ramon O. Ramirez
*Attorney, Agent, or Firm*—Dennison, Meserole, Pollack & Scheiner

[57] ABSTRACT

A holder including a fastening member, a base member, and a hinged connecting member for interconnecting the fastening member and the base member in a manner that the fastening member can be pivoted for the base member. The fastening member has a mounting block including a through hole. The base member has a mating portion including an insertion opening. The mounting block has engagement means engageable with engagement means provided on a bracket mounted on an automobile body. The engagement means of the bracket is engaged with the engagement means of the mounting block when the bracket is received in the through hole passed through the insertion opening, whereby the fastening member is mounted on the bracket in its closed position.

10 Claims, 4 Drawing Sheets

HOLDER FOR FIXING WIRING HARNESS AND THE LIKE TO AUTOMOBILE BODY

BACKGROUND OF THE INVENTION

The present invention relates to a holder to clamp a wire bundle such as a wiring harness and a hose for piping and to fix the same in the engine compartment of an automobile and the like.

One example of a conventional holder is shown in FIG. 7. The conventional holder 220 includes a base member 221 having a curved surface on which a pair of curved supporting ribs 230 are formed, a fastening member 222 having a curved surface on which a pair of curved fastening ribs 240 are formed, and a hinged connecting member 223 interconnecting the base member 221 and the fastening member 222. The hinged connecting member 223 permits pivotal movement of the fastening member 222 between a closed or clamping position (not shown) and an open position as shown in FIG. 7. The base member 221 includes a mounting portion 224 having an insertion opening in which a bracket 225 mounted on an automobile body 214 is received. The base member 221 also includes an engagement lip 227. When the fastening member 222 is pivoted to the clamping position, the engagement 227 may engage an engagement lip 228 provided on the fastening member 222 to achieve the desired snap-interfit therebetween.

To operate the holder 220 thus constructed, an article W such as a wiring harness and a hose is seated on the curved supporting ribs 230 of the base member 221, with the fastening member 222 pivoted to the open position. The fastening member 222 is then pivoted toward its clamping position until the engagement lip 228 is completely engaged with the engagement lip 227 so that the article W is clamped between the supporting ribs 230 of the base member 221 and the fastening ribs 240 of the fastening member 222. Subsequently, the holder 220 is put on the bracket 225 in a manner that the bracket 225 mounted on the automobile body 214 is received in the insertion opening formed on the mounting portion 224 of the base member 221. Thus, the article W is fixedly held on the automobile body 214.

A problem usually associated with the conventional holder is that the engagement lips 227 and 228 are simply engaged with each other to keep the clamping position of the fastening member 222. Therefore, when the engagement lips 227 and 228 are accidentally disengaged, the fastening member 222 is easily moved to its open position, thereby causing falling off of the article W from the holder 220.

SUMMARY OF THE INVENTION

It is an object of the invention to provide a holder which may eliminate the conventional problems, that is, which may securely clamp an article such as a wiring harness and a hose.

The present invention provides a holder of the type used for a bracket mounted on an automobile body for fixing an article such as wiring harness to the automobile body. The holder includes a fastening member having a curved surface, a base member having a curved surface, a hinged connecting member for interconnecting the fastening member and the base member in a manner that the fastening member can be pivoted for the base member, and locking means provided on the fastening member and the base member for keeping the fastening member in a closed position generally opposing to the base member. The fastening member has a mounting block provided on the free end thereof. The mounting block includes a through hole which may receive the bracket therein. The base member has a mating portion provided on the free end thereof. The mating portion includes an insertion opening which may receive the bracket therein. The insertion opening is adapted to align with the through hole when the fastening member is pivoted to the closed position. The mounting block has engagement means provided in the through hole. The engagement means are adapted to engage engagement means provided on the bracket. The fastening member, when pivoted to the closed position, may clamp the article between the curved surfaces of the base member and the fastening member. The engagement means provided on the bracket are adapted to engage the engagement means provided on the mounting block when the bracket is received in the through hole passed through the insertion opening, whereby the fastening member is mounted on the bracket in the closed position thereof.

An important feature of the present invention is that if the locking means provided on the base member and the fastening member are accidentally released, the fastening member remains substantially in the closed position, thereby offering the advantage that the article is stably clamped between the base member and the fastening member. This may effectively prevent coming off of the article from the holder.

The present invention will become more fully apparent from the claims and the description as it proceeds in connection with the drawings.

DETAILED DESCRIPTION OF THE PREFERRED EMBODIMENT

Referring now to FIGS. 1 to 4, shown therein is a holder 1 according to a first embodiment of the present invention.

Figure 1:
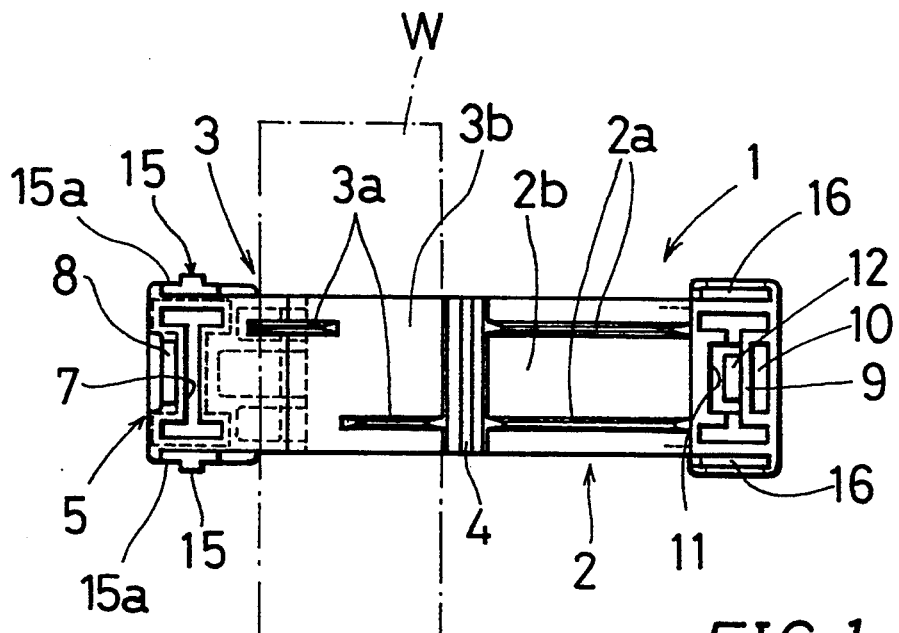
FIG. 1 is a plan view showing a holder according to a first embodiment of the present invention with a fastening member moved to its open position.
Figure 2:
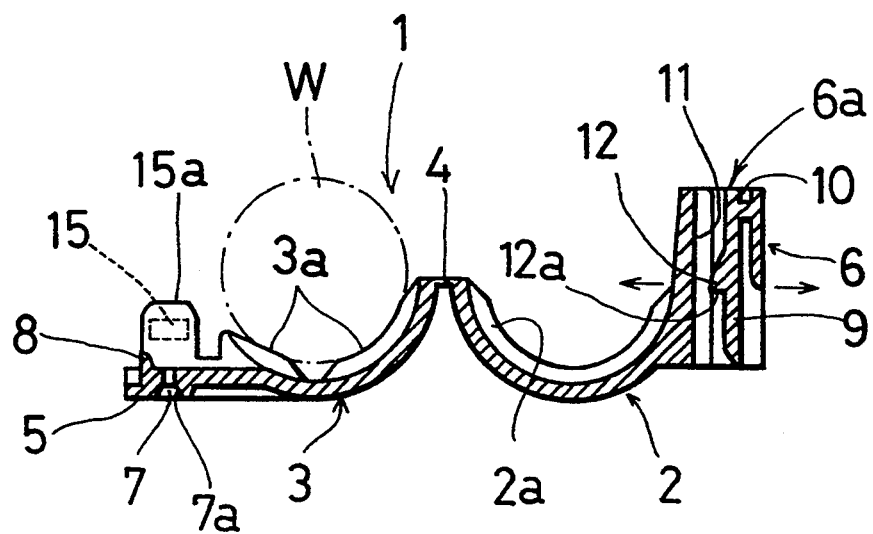
FIG. 2 is a sectional view of FIG. 1.

As shown in FIGS. 1 and 2, the holder 1 includes a base member 3 having a curved surface 3b on which a pair of curved supporting ribs 3a are formed, a fastening member 2 having a curved surface 2b on which a pair of fastening ribs 2a are formed, and a hinged connecting member 4 for interconnecting the base member 3 and the fastening member 2. The hinged connecting member 4 permits pivotal movement of the fastening member 2 between a closed or clamping position generally opposing to the base member 3 and an open position being laterally parallel with the base member 3. As will be appreciated, when the fastening member 2 is pivoted to the closed position, a generally cylindrical space is formed between the base member 3 and the fastening member 2 for receiving an article W such as a wiring harness and a hose for piping therein.

As best shown in FIG. 2, the base member 3 includes a plate-like mating portion 5 having a flat upper surface. The upper surface of the mating portion 5 is adapted to closely face to a mating surface 6a of a mounting block 6 (which will be hereinafter described) formed on the fastening member 2 when the fastening member 2 is pivoted to the closed position.

As best shown in FIG. 2, the mating portion 5 is provided with a pair of vertical strips 15a upwardly extended from the side edges thereof. The outer side surface of the each vertical strip 15a is provided with a downward ramp-like engagement projection 15. Formed on the mating portion 5 is a transverse insertion opening 7 which may closely receive a bracket 13 mounted on the automobile body to be hereinafter described. The insertion opening 7 includes a flared receiving surface 7a so that the bracket 13 is easily received into the insertion opening 7. The upper surface of the mating portion 5 is also provided with a lateral positioning projection 8 which is upwardly projected and which extends along the front end (left end) of the mating portion 5. The positioning projection 8 is configured to fit into the positioning groove formed on the mating surface 6a of the mounting block 6 to be hereinafter described when the fastening member 2 is pivoted to the closed position. This may permit accurate positioning of the mounting block 6 onto the upper surface of the mating portion 5 as the fastening member 2 is pivoted to the closed position.

FIG. 2 illustrates the mounting block 6 formed on the free end of the fastening member 2. The mounting block 6 includes a vertical through hole 11 which may receive the bracket 13 therein. The mounting block 6 also has the mating surface 6a on the upper end thereof.

As shown in FIG. 1, the mounting block 6 includes a pair of opposed outwardly projecting apertured ears 16 which are engageable with the engagement projections 15 formed on the vertical strips 15a of the mating portion 5. As will be appreciated from the drawings, when the fastening member 2 is moved to the closed position, the apertured ears 16 are engaged with the engagement projections 15 to lock the fastening member 2 in the clamping position.

The through hole 11 is so formed as to align with the insertion opening 7 of the mating portion 5 when the fastening member 2 is moved to the closed position. Therefore, the through hole 11 may receive the bracket 13 passed through the insertion opening 7 of the mating portion 5.

Further, as best shown in FIG. 2, the mounting block 6 has a flexible tongue 9 downwardly or inwardly projected from the mating surface 6a and extending along the through hole 11. The tongue 9 may laterally flex, that is, may flex in the directions indicated by the arrows in FIG. 2. The tongue 9 has a ramp-like engagement protrusion 12 which may fit in the opening (not shown) formed on the bracket 13.

As shown in FIG. 2, formed on the mating surface 6a of the mounting block 6 is a positioning groove 10 which may fit to the positioning projection 8 upon pivotal movement of the fastening member 2 to the closed position. As previously described herein, the positioning groove 10 cooperates with the positioning projection 8 of the mating portion 5 to form a positioner for accurate positioning and stabilization of the mounting block 6 on the upper surface of the mating portion 5.

Figure 3:
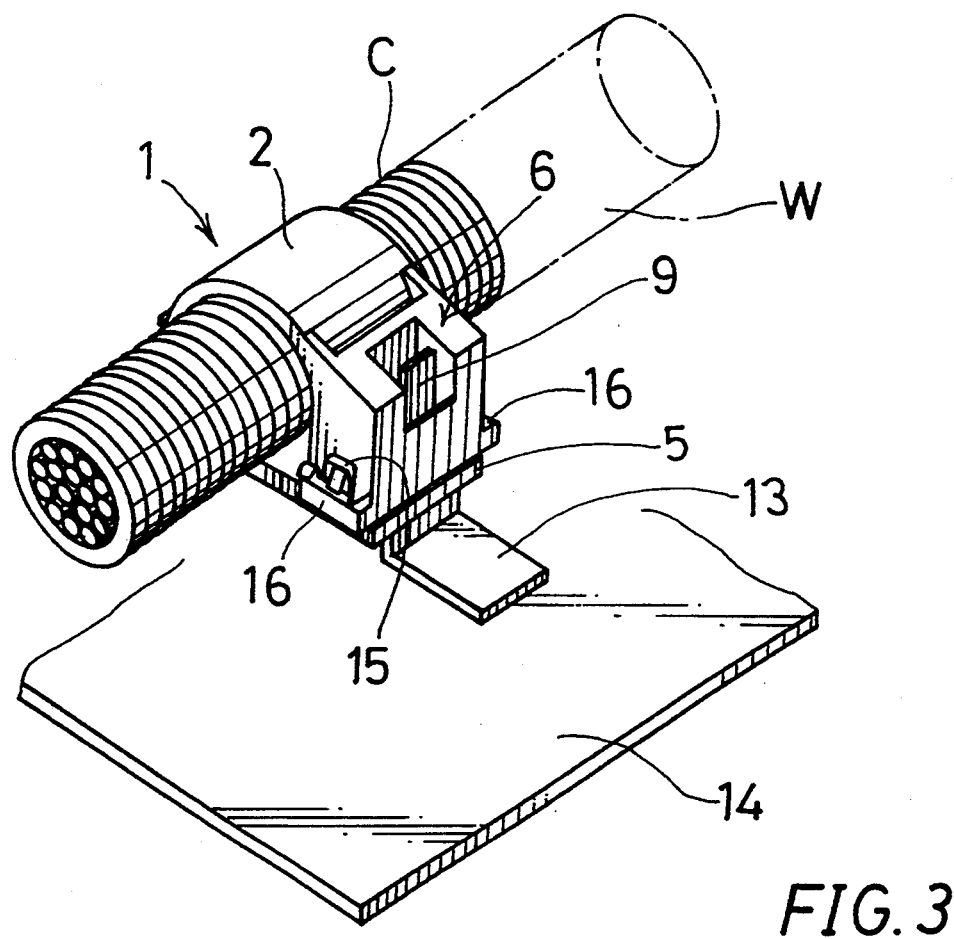
FIG. 3 is a perspective view showing the holder which is in use.
Figure 4:
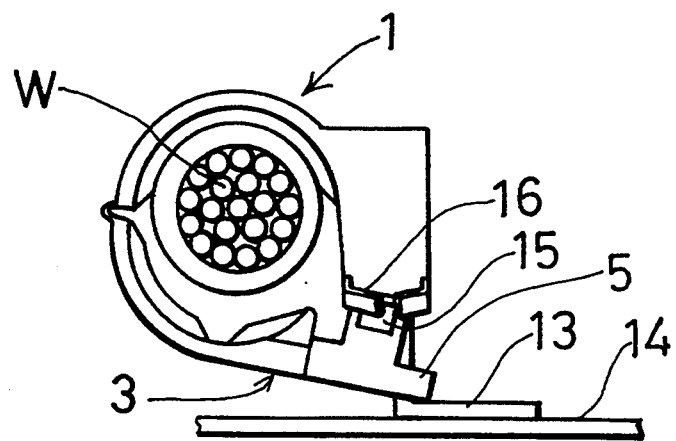
FIG. 4 is a side view of FIG. 3 with locking projections disengaged from apertured ears.

As shown in FIGS. 3 and 4, fixedly mounted on an automobile body 14 is the bracket 13 which acts as a fitting for mounting the holder 1 on the automobile body 14. The bracket 13 is of an L-shaped one-piece member including an opening (not shown) which may accept the engagement protrusion 12 formed on the tongue 9 of the mounting block 6. As described above, when the bracket 13 is introduced into the through hole 11 passed through the insertion opening 7, the engagement protrusion 12 fits in the opening formed on the bracket 13. As will be easily understood, the engagement protrusion 12 remains fitted in the opening of the bracket 13 because of a stopper surface 12a of the engagement protrusion 12, which tends to stably hold the holder 1 on the automobile body 14.

The operation of the holder 1 thus constructed will now be explained with reference to the drawings.

The fastening member 2 of the holder 1 is firstly pivoted to the open position. The holder 1 is subsequently put on the bracket 13 mounted on the automobile body 14 so that the bracket 13 is received in the insertion opening 7. The article W is then positioned on the curved surface 3b of the base member 3. Thereafter, the fastening member 2 is pivoted to the closed position to snap the engagement projections 15 into the apertured ears 16, thereby to clamp the article W between the curved surfaces 2b and 3b. It is to be noted that the fastening member 2 is locked in the closed position by the relative engagement of the engagement projections 15 and the apertured ears 16.

Further, as shown in FIG. 3, if the article W is covered by a corrugate tube C, the supporting ribs 3a and the fastening ribs 2a are effectively fitted into the circumferential grooves of the corrugate tube C, which tends to stably clamp the article W between the curved surface 2b and 3b for effectively preventing axial movement of the article W.

Upon movement of the fastening member 2 to the clamping position thereof, the bracket 13 upwardly projected through the insertion opening 7 is introduced into the through hole 11 of the fastening member 2, and the engagement protrusion 12 of the tongue 9 is fitted into the opening of the bracket 13. As previously described herein, the engagement protrusion 12, once fitted in the opening of the bracket 13, remains fitted therein by virtue of the stopper surface 12a of the engagement protrusion 12, thereby preventing coming off of the fastening member 2 from the bracket 13. As a result, the holder 1 is stably held on the bracket 13 with the article W clamped thereby. It is important to note that the relative engagement of the engagement protrusion 12 and the opening of the bracket 13 may act as an additional locking mechanism for maintaining the fastening member 2 in the clamping position.

Thus, in this construction, the fastening member 2 is sufficiently locked in the closed position by substantially two locking mechanisms, that is, by the relative engagement of the engagement projections 15 and the apertured ears 16 and by the relative engagement of the engagement protrusion 12 and the opening of the bracket 13.

Further, as previously described herein, in the closed position of the fastening member 2, the positioning projection 8 is engaged with the positioning groove 10 so as to prevent sliding movement of the mounting block 6 on the upper surface of the mating portion 5.

It is expected that, as shown in FIG. 4, the engagement projections 15 may be accidentally disengaged from the apertured ears 16, as a result of damage to the apertured ears 16, for example. According to the holder 1 thus constructed, even if the engagement projections 15 are disengaged from the apertured ears 16, the fastening member 2 never pivots toward the open position because of the fitting engagement of the engagement protrusion 12 and the opening of the bracket 13. The base member 3, on the other hand, also remains substantially in the original position since the bracket 13 is closely received in the insertion opening 7 of the mating portion 5 so as to effectively minimize the pivotal movement (slightly magnified in FIG. 4 for illustrative purposes) of the base member 3. As a result, if the engagement projections 15 are accidentally disengaged from the apertured ears 16, the fastening member 2 remains substantially in the closed position, thereby preventing coming off of the article W from the holder 1.

Although, in the preferred embodiment as described above, the holder 1 is mounted on the bracket 13 before clamping the article W between the base member 3 and the fastening member 2, the article W can be clamped prior to mounting the holder 1 onto the bracket 13, if desired.

Furthermore, the preferred embodiment herein described can be modified, if required. For example, the engagement protrusion 12 and the opening to be engaged with the engagement protrusion 12 can be formed on the bracket 13 and the tongue 9, respectively.

A second embodiment modified from the first embodiment of the present invention will now be described with reference to FIGS. 5 and 6, wherein only parts different from those shown in FIGS. 1 to 4 will be explained.

Figure 5:
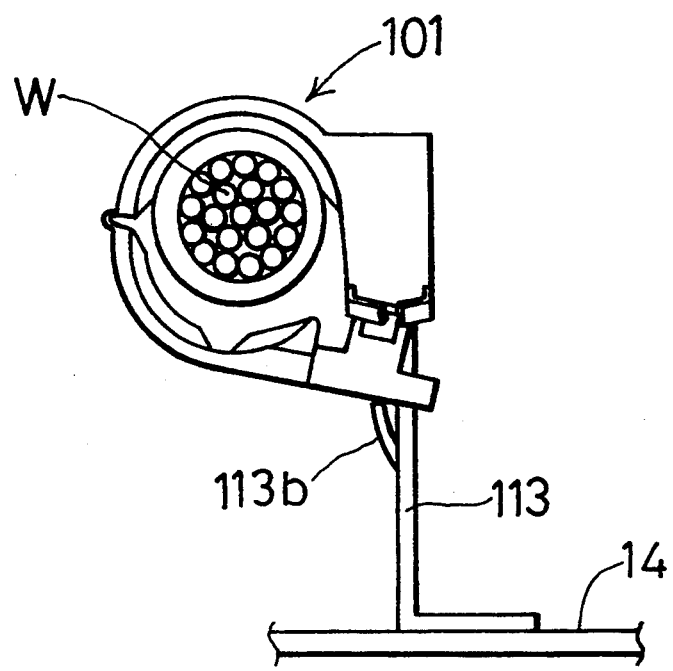
FIG. 5 is a view similar to FIG. 4, but showing a second embodiment of the present invention.
Figure 6:
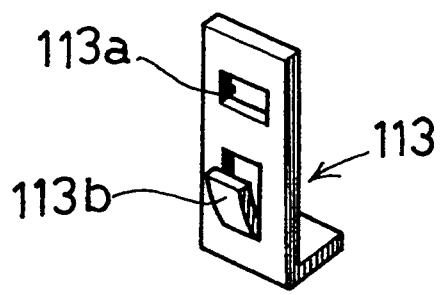
FIG. 6 is a perspective view showing a bracket used in the second embodiment.
Figure 7:
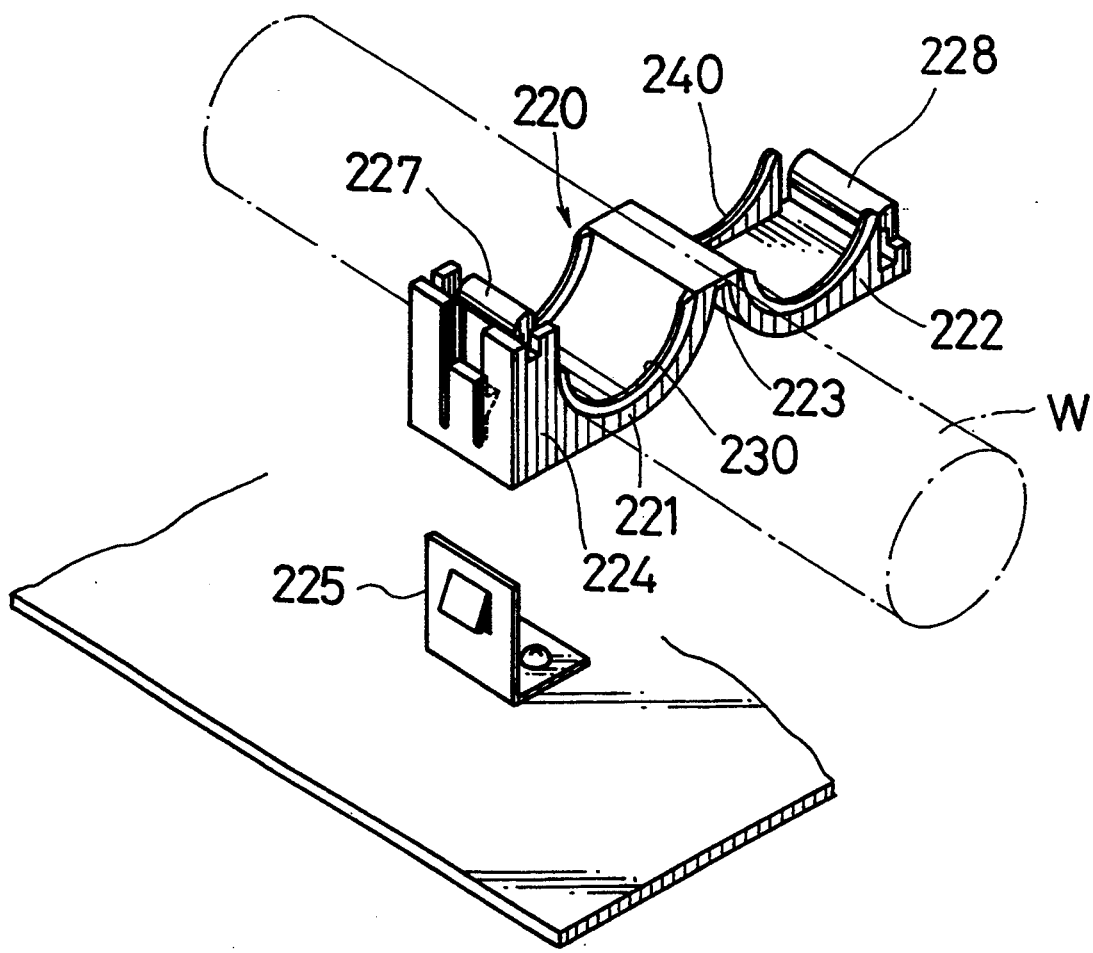
FIG. 7 is a perspective view showing a conventional holder and a bracket in combination.

Referring to FIGS. 5 and 6, shown therein is a holder 101 and a bracket 113 according to a second embodiment of the present invention.

As shown therein, the holder 101 is identical in construction to the holder 1 in the first embodiment of the present invention.

As best shown in FIG. 6, the bracket 113 to be provided on the automobile body 14 is of an elongated L-shaped one-piece member and including an opening 113a and a lower projection 113b stamped thereon.

In operation, the holder 101 is put on the bracket 113 mounted on the automobile body 14 in the same manner as the first embodiment of the present invention. As will be appreciated, the lower abutment 113b of the bracket 113 may act as a restriction member for positioning the holder 101 in the upper portion of the bracket 113. Thereafter, the article W is clamped by the holder 101 in the same manner as the first embodiment of the present invention. As a result, the holder 101 is stably held on the upper portion of the bracket 113 with the article W clamped thereby.

In this modified construction, the article W can be positioned at a desired distance from the automobile body 14. Therefore, such a construction will be preferable in a case that the article W can not be arranged close to the automobile body 14, that is, the article W must be apart form the automobile body 14 to prevent interference between the article W and the other parts arranged on the automobile body 14.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A holder of the type used for a bracket mounted on an automobile body for fixing an article such as wiring harness to the automobile body, comprising:
    a fastening member having a curved surface;
    a base member having a curved surface;
    a hinged connecting member for interconnecting said fastening member and said base member in a manner that said fastening member can be pivoted relative to said base member; and
    locking means provided on said fastening member and said base member for keeping said fastening member in a closed position generally opposing to said base member,
    said fastening member having a mounting block provided on the free end thereof, said mounting block including a through hole which receives said bracket therein, said base member having a mating portion provided on the free end thereof, said mating portion including an insertion opening which receives said bracket therein, said insertion opening aligning with said through hole when said fastening member is pivoted to the closed position, said mounting block having engagement means provided in said through hole, said engagement means being adapted to engage engagement means provided on said bracket, said fastening member, when pivoted to the closed position, being operable to clamp the article between said curved surfaces of said base member and said fastening member, said engagement means provided on said bracket being adapted to engage said engagement means provided on said mounting block when said bracket is received in said through hole passed through said insertion opening, whereby said fastening member is mounted on said bracket in the closed position thereof.

2. The holder as defined in claim 1, wherein said locking means comprises engagement projections provided on said mating portion and apertured ears provided on said mounting block, said engagement projections being adapted to engage said apertured ears when said fastening member is pivoted to the closed position.

3. The holder as defined in claim 1 further comprising positioning means provided on said fastening member and said base member for accurately positioning said mounting block on said mating portion when said fastening member is pivoted to the closed position.

4. The holder as defined in claim 3, wherein said positioning means comprises a positioning projection formed on said mating portion and a positioning recess formed on said mounting block, said positioning projection being adapted to engage said positioning recess when said fastening member is pivoted to the closed position.

5. The holder as defined in claim 1, wherein said insertion opening includes a flared receiving surface so that said bracket is easily received into said insertion opening.

6. A holder of the type used for a bracket mounted on an automobile body for fixing an article such as wiring harness to the automobile body, comprising:
    a fastening member having a curved surface;
    a base member having a curved surface;

a hinged connecting member for interconnecting said fastening member and said base member in a manner that said fastening member can be pivoted relative to said base member; and locking means provided on said fastening member and said base member for keeping said fastening member in a closed position generally opposing to said base member, said fastening member having a mounting block provided on the free end thereof, said mounting block including a through hole receiving said bracket therein, said base member having a mating portion provided on the free end thereof, said mating portion including an insertion opening receiving said bracket therein, said insertion opening aligning with said through hole when said fastening member is pivoted to the closed position, said mounting block having an engagement protrusion provided in said through hole, said engagement protrusion being adapted to engage an engagement opening provided on said bracket, said fastening member, when pivoted to the closed position, being operable to clamp the article between said curved surfaces of said base member and said fastening member, said engagement opening provided on said bracket engaging said engagement protrusion provided on said mounting block when said bracket is received in said through hole passed through said insertion opening, whereby said fastening member is mounted on said bracket in the closed position thereof.

7. The holder as defined in claim 6 further comprising a flexible tongue provided on said mounting block of said fastening member and extending along said through hole, said engagement protrusion being formed on said flexible tongue.

8. The holder as defined in claim 6 further comprising a tongue provided in said mounting block of said fastening member, said engagement protrusion being formed on said tongue and protruded into said through hole.

9. A holder of the type used for an elongated bracket mounted on an automobile body for fixing an article such as wiring harness to the automobile body, comprising:

a fastening member having a curved surface;

a base member having a curved surface;

a hinged connecting member for interconnecting said fastening member and said base member in a manner that said fastening member can be pivoted relative to said base member; and locking means provided on said fastening member and said base member for keeping said fastening member in a closed position generally opposing to said base member;

said fastening member having a mounting block provided on the free end thereof, said mounting block including a through hole receiving said bracket therein, said base member having a mating portion provided on the free end thereof, said mating portion including an insertion opening receiving said bracket therein, said insertion opening aligning with said through hole when said fastening member is pivoted to the closed position, said mounting block having an engagement protrusion provided in said through hole, said engagement protrusion being adapted to engage an engagement opening provided on said bracket, said fastening member, when pivoted to the closed position, being operable to clamp the article between said curved surfaces of said base member and said fastening member, said mating portion of said base member being adapted to contact a stamped lower abutment formed on said bracket when said bracket is received in said insertion opening, said engagement opening provided on said bracket engaging said engagement protrusion provided on said mounting block when said bracket is received in said through hole passed through said insertion opening, whereby said fastening member is mounted on said bracket in the closed position thereof.

10. A holder of the type used for a supporting bracket for fixing an article, comprising:

a fastening member having a depressed surface;

a base member having a depressed surface; and a hinged connecting member for interconnecting said fastening member and said base member in a manner that said fastening member can be pivoted relative to said base member, said fastening member having a mounting block provided on the free end thereof, said mounting block including a through hole which receives said bracket therein, said base member having a mating portion provided on the free end thereof, said mating portion including an insertion opening which receives said bracket therein, said insertion opening aligning with said through hole when said fastening member is pivoted to a closed position generally opposing to said base member, said mounting block having engagement means provided in said through hole, said engagement means being adapted to engage engagement means provided on said bracket, said fastening member, when pivoted to the closed position, being operable to clamp the article between said depressed surfaces of said base member and said fastening member, said engagement means provided on said bracket being adapted to engage said engagement means provided on said mounting block when said bracket is received in said through hole passed through said insertion opening, whereby said fastening member is mounted on said bracket in the closed position thereof.

* * * * *

UNITED STATES PATENT AND TRADEMARK OFFICE
CERTIFICATE OF CORRECTION

PATENT NO. : 5,390,876
DATED : February 21, 1995
INVENTOR(S) : Takanori Hatano; Takayoshi Ito; Noboru Miyazaki;
Ryuji Umehara and Tomoharu Kamo It is certified that error appears in the above-indentified patent and that said Letters Patent is hereby corrected as shown below:

On the title page: Item [73] should read as follows:

--Daiwa Kasei Kogyo Kabushiki Kaisha, Okazaki; Sumitomo Denso Kabushiki Kaisha, Yokkaichi; Honda Giken Kogyo Kabushiki Kaisha, Tokyo, all of Japan--

Signed and Sealed this

Eighth Day of August, 1995

*Attest:*

BRUCE LEHMAN

*Attesting Officer*          Commissioner of Patents and Trademarks